US009873810B2

(12) United States Patent
Takahashi et al.

(10) Patent No.: US 9,873,810 B2
(45) Date of Patent: Jan. 23, 2018

(54) WHITE INK FOR INK-JET

(71) Applicants: TOYO INK SC HOLDINGS CO., LTD., Chuo-ku (JP); TOYO INK CO., LTD., Chuo-ku (JP)

(72) Inventors: Yukitoshi Takahashi, Tokyo (JP); Norio Suzuki, Tokyo (JP)

(73) Assignees: TOYO INK SC HOLDINGS CO., LTD., Chuo-ku (JP); TOYO INK CO., LTD., Chuo-ku (JP)

( * ) Notice: Subject to any disclaimer, the term of this patent is extended or adjusted under 35 U.S.C. 154(b) by 0 days.

(21) Appl. No.: 15/357,798

(22) Filed: Nov. 21, 2016

(65) Prior Publication Data

US 2017/0137649 A1 May 18, 2017

Related U.S. Application Data

(62) Division of application No. 14/786,686, filed as application No. PCT/JP2014/061743 on Apr. 25, 2014, now Pat. No. 9,534,126.

(30) Foreign Application Priority Data

Apr. 25, 2013 (JP) ................. 2013-092483

(51) Int. Cl.
*C08F 2/46* (2006.01)
*C08F 2/50* (2006.01)
*C08G 61/04* (2006.01)
*C09D 11/322* (2014.01)
*C09D 11/36* (2014.01)
*C09D 11/101* (2014.01)
*C09D 11/104* (2014.01)
*C09D 135/02* (2006.01)
*C08K 3/22* (2006.01)
*C08K 9/02* (2006.01)

(52) U.S. Cl.
CPC .......... *C09D 11/322* (2013.01); *C09D 11/101* (2013.01); *C09D 11/104* (2013.01); *C09D 11/36* (2013.01); *C09D 135/02* (2013.01); *C08K 9/02* (2013.01); *C08K 2003/2241* (2013.01); *C08K 2201/003* (2013.01)

(58) Field of Classification Search
CPC .. C09D 11/322; C09D 11/101; C09D 135/02; C09D 11/36; C09D 11/104; C08K 2201/003; C08K 2003/2241; C08K 9/02
USPC ...... 522/18, 12, 7, 6, 71, 189, 184, 1; 520/1
See application file for complete search history.

(56) References Cited

U.S. PATENT DOCUMENTS

| 7,026,368 | B2 | 4/2006 | Yamada et al. | |
| 7,723,400 | B2* | 5/2010 | Kobayashi | C09D 11/101 106/31.13 |
| 7,901,501 | B2 | 3/2011 | Kobayashi | |
| 9,534,126 | B2* | 1/2017 | Takahashi | C08K 9/02 |
| 2004/0024091 | A1* | 2/2004 | Yamada | C09D 11/36 523/160 |
| 2006/0155005 | A1* | 7/2006 | Kondo | B41J 11/002 523/160 |
| 2012/0133059 | A1 | 5/2012 | Ito et al. | |
| 2012/0133060 | A1* | 5/2012 | Nakane | C09D 11/322 257/788 |
| 2012/0147095 | A1 | 6/2012 | Miura et al. | |
| 2012/0189822 | A1 | 7/2012 | Ito et al. | |
| 2013/0321520 | A1* | 12/2013 | Ito | C09D 11/40 347/20 |

FOREIGN PATENT DOCUMENTS

| CN | 1495236 A | | 5/2004 |
| EP | 2 042 568 A1 | | 4/2009 |
| EP | 2 489 708 A1 | | 8/2012 |
| JP | 2003 191507 | | 7/2003 |
| JP | 2004-124077 | * | 4/2004 |
| JP | 2004 124077 | | 4/2004 |
| JP | 2004-224841 | * | 8/2004 |
| JP | 2004 224841 | | 8/2004 |
| JP | 2007 332166 | | 12/2007 |
| JP | 2008 308692 | | 12/2008 |
| JP | 2009 209289 | | 9/2009 |
| JP | 4799987 | | 10/2011 |
| JP | 4807816 | | 11/2011 |
| JP | 4902216 | | 3/2012 |
| JP | 2012 116928 | | 6/2012 |
| JP | 2012-116928 | * | 6/2012 |

(Continued)

OTHER PUBLICATIONS

Yamada et al, JP 2004-124077 Machine Translation, Apr. 22, 2004.*
Fukada et al, JP 2004-224841 Machine Translation, Aug. 12, 2004.*
Nakane et al, JP 2012-116928 Machine Translation, Jun. 21, 2012.*
International Search Report dated Jul. 29, 2014 in PCT/JP14/061743 Filed Apr. 25, 2014.
Third Party Observation submitted Mar. 17, 2015 in PCT/JP14/061743 Filed Apr. 25, 2014.
Extended European Search Report dated Mar. 10, 2016 in Patent Application No. 14788180.9.
Combined Chinese Office Action and Search Report dated May 19, 2016 in Patent Application No. 201480023342.3 (with English language translation).

(Continued)

*Primary Examiner* — Jessica Whiteley
(74) *Attorney, Agent, or Firm* — Oblon, McClelland, Maier & Neustadt, L.L.P.

(57) ABSTRACT

To provide an ink-jet white ink of active energy ray-curable type, wherein the white ink has high printing stability and good hiding property, and is particularly suitable for printing on the single-pass ink-jet printing system. An ink-jet white ink of active energy ray-curable type, comprising titanium oxide, a pigment dispersant, and a polymerizable compound, wherein the content of the titanium oxide is from 15 to 30% by weight with reference to the total weight of the ink, and wherein the weight average particle diameter of the titanium oxide is 180 to 250 nm. In an embodiment of the ink, the titanium oxide is titanium oxide that surface is treated with silica and the pigment dispersant comprises a basic dispersant.

9 Claims, No Drawings

(56) References Cited

FOREIGN PATENT DOCUMENTS

| | | |
|---|---|---|
| JP | 2012-116929 A | 6/2012 |
| JP | 2012-116933 A | 6/2012 |
| JP | 2012-116934 A | 6/2012 |
| JP | 2012 140583 | 7/2012 |
| JP | 4979177 | 7/2012 |
| JP | 102558958 A | 7/2012 |
| JP | 2012-149206 A | 8/2012 |
| JP | 2012 158745 | 8/2012 |
| JP | 2012-193229 A | 10/2012 |
| JP | 2012 193260 | 10/2012 |
| JP | 2012 241057 | 12/2012 |
| JP | 2013 129746 | 7/2013 |
| JP | 2014 5438 | 1/2014 |
| WO | 2006 075458 | 7/2006 |

OTHER PUBLICATIONS

International Preliminary Report on Patentability and Written Opinion dated Nov. 5, 2015 in PCT/JP2014/061743.

\* cited by examiner

WHITE INK FOR INK-JET

TECHNICAL FIELD

The present invention relates to an ink-jet white ink of active energy ray-curable type, wherein the white ink has high printing stability and good hiding property, and is particularly suitable for printing on the single-pass ink-jet printing system.

BACKGROUND ART

Ink-jet printing system jets and lands minute droplets of ink from ink-jet heads on a base material to be printed, thereby printing by forming an image or characters on the base material. This ink-jet printing system does not require a printing plate for printing. Electrographic system is a widely known as a typical printing system requiring no printing plate. However, the ink-jet printing system is superior to the electrographic system in the initial cost of the apparatus, the running cost of printing, the apparatus size, and high-speed printability.

The ink-jet printing system typically uses ink-jet ink of active energy ray-curable type. This ink mainly contains polymerizable compounds such as a reactive monomer and oligomer, and a polymerization initiator such as a photo-radical generator and a photoacid generator. In the printing on this printing system, the ink is landed on a base material to be printed, and then active energy rays are applied to the ink to cause polymerization reaction of the ink components, thereby forming an image and characters.

In recent years, with the improvement of performance of ink-jet heads, the application of the ink-jet printing system to the existing printing market using offset printing and other systems is expected. In the existing printing market, productivity is very important. However, the multi-pass printing system is used in the sign market, and this printing system is insufficient to achieve the desired productivity. Therefore, in the printing market, in order to achieve productivity using the ink-jet printing system which cannot be obtained by the multi-pass printing system, the use of the single-passing system which allows high-speed printing is desired.

The single-passing system often uses fixed ink-jet heads, and thus requires head cleaning. Typically, head cleaning is carried out once per every several hours, and the frequency is low. Therefore, the single-passing system requires the designing of ink which will not cause deflection or ejection failure of ink. In particular, when titanium oxide is used as the white pigment of a white ink, specific gravity of the pigment in the ink is high. Therefore, when the apparatus is ceased for a while, the pigment tends to sediment in the nozzles. Furthermore, pigment sedimentation tends to cause problems such as ink ejection failure (nozzle void), so that improvement is desired.

Patent Literatures 1 to 3 disclose the methods for preventing sedimentation of titanium oxide through the surface treatment of titanium oxide used as the pigment, and/or the use of a specific pigment dispersant. Prevention of sedimentation of titanium oxide likely improves ejection stability. However, by any of these disclosed methods, it is difficult to achieve sufficient ejection stability over a long time which allows favorable use of inks on the single-passing system.

Patent Literature 4 discloses a method of improving pigment sedimentation by using hollow particles in place of titanium oxide as the white pigment. The hollow particles have a lower specific gravity than titanium oxide, so that the hollow particles resist sedimentation even in a low viscosity ink. However, the hollow particles tend to have lower hiding property in comparison with titanium oxide. Therefore, in order to achieve a sufficient printing concentration by printing on the single-passing system, for example, the printing concentration must be improved by using multiple heads, which may cause a problem of capsizing of the apparatus.

CITATION LIST

Patent Literatures

Patent Literature 1: Japanese Patent No. 4799987
Patent Literature 2: Japanese Patent No. 4807816
Patent Literature 3: Japanese Patent No. 4979177
Patent Literature 4: Japanese Patent No. 4902216

SUMMARY OF INVENTION

Technical Problem

In view of the above-described circumstances, the present invention is intended to provide an ink-jet white ink of active energy ray-curable type, wherein the white ink has high printing stability and good hiding property, and is particularly suitable for printing on the single-pass ink-jet printing system.

Solution to Problem

One embodiment of the present invention relates to an ink-jet white ink of active energy ray-curable type, comprising titanium oxide, a pigment dispersant, and a polymerizable compound, wherein the content of the titanium oxide is from 15 to 30% by weight with reference to the total weight of the ink, and wherein the weight average particle diameter of the titanium oxide is from 180 to 250 nm.

In the white ink, the titanium oxide preferably includes titanium oxide treated with a surface-treating agent. The titanium oxide preferably has hydroxyl groups on treated surface thereof. In addition, in the white ink, the titanium oxide is preferably the titanium oxide whose surface is treated with silica.

In the white ink, the pigment dispersant preferably includes a basic dispersant.

In the white ink, the polymerizable compound preferably includes at least one of the polymerizable compounds represented by the following general formulae (1) and (2):

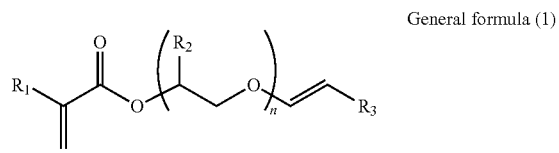

General formula (1)

(R1 and R2 are each independently a hydrogen atom or a methyl group, R3 is a hydrogen atom or an alkyl group with 1 to 10 carbon atoms, and n represents an integer of 1 to 10.)

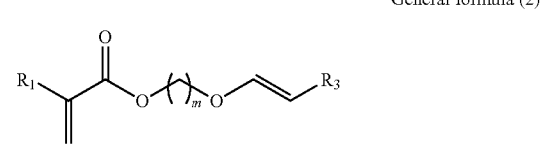

General formula (2)

(R1 is a hydrogen atom or a methyl group, R3 is a hydrogen atom or an alkyl group with 1 to 10 carbon atoms, and m represents an integer of 1 to 10.).

It is preferable that the white ink further includes a polymerization initiator and that the polymerization initiator includes at least one selected from the group consisting of 2,4,6-trimethylbenzoyldiphenylphosphine oxide, bis(2,4,6-trimethylbenzoyl)phenylphosphine oxide, and 4-benzoyl-4'-methyldiphenyl sulfide.

It is preferable that the white ink further includes an organic solvent and that the content of the organic solvent is from 0.01 to 5% by weight with reference to the total weight of the ink.

It is preferable that the white ink is used for printing on the single-pass ink-jet printing system.

Advantageous Effects of Invention

The present invention provides an ink-jet white ink of active energy ray-curable type, the white ink having high printing stability and good hiding property. The white ink is suitable for printing on the single-pass ink-jet printing system.

Disclosure of the present invention relates to the subject of Japanese Patent Application No. 2013-092483 filed on Apr. 25, 2013, and the disclosure of which is incorporated by reference herein.

DESCRIPTION OF EMBODIMENTS

Details about the present invention are described below based on preferred embodiments.
<White Ink for Ink-Jet Printing>

One embodiment of the present invention relates to an ink-jet white ink of active energy ray-curable type (hereinafter referred to as "white ink"). The white ink is intended to be used under the printing system wherein ink is jetted and landed on a base material to be printed by the ink-jet printing system, and then the ink coating film is cured by irradiation with active energy ray, thereby an image and characters are formed. The term "active energy rays" herein means the energy beams in a broad sense which can provide energy necessary for the activation of chemical reaction. Not particularly limited, but in one embodiment of the present invention, the active energy rays are preferably light energy containing ultraviolet rays. The white ink contains titanium oxide, a pigment dispersing resin, and a polymerizable compound, the content of titanium oxide is from 15 to 30% by weight with reference to the total weight of the white ink, and the titanium oxide has a weight average particle diameter of 180 to 250 nm. The components of the white ink are more specifically described below.
(Pigment)

The white ink of the present invention includes titanium oxide having a weight average particle diameter of 180 to 250 nm as the white pigment. The titanium oxide may be untreated or surface-treated. In the white ink, if the weight average particle diameter of the titanium oxide is too small, sufficient hiding property cannot be achieved. On the other hand, if the weight average particle diameter of the titanium oxide is too large, sedimentation of the titanium oxide is hastened. Therefore, titanium oxide included in the ink in the ink-jet head sediments in a short time, and decap property tends to deteriorate. Regarding this, in the present invention, the titanium oxide has a weight average particle diameter of 180 to 250 nm, so that decap property during printing is improved, and printing is successfully carried out over a long time. In one embodiment, the weight average particle diameter of the titanium oxide is preferably from 200 to 250 nm, and more preferably from 220 to 250 nm.

The term "weight average particle diameter" used herein means not the primary particle diameter of titanium oxide, but the particle diameter of titanium oxide dispersed in the ink, more specifically the secondary particle diameter. The secondary particle diameter can be confirmed by, for example, a particle diameter distribution analyzer of dynamic light scattering type.

In the present invention, the primary particle diameter of the titanium oxide used as the ink material is not particularly limited. However, when titanium oxide having a primary particle diameter larger than the range of the secondary particle diameter defined in the white ink of the present invention is used, the primary particles must be micronized. Such micronization causes destruction of titanium oxide, or peeling of the treating agent from the surface of titanium oxide, and tends to cause deterioration of dispersion stability or inclusion of coarse particles. Accordingly, in one embodiment, it is preferred that titanium oxide having a primary particle diameter of 150 to 250 nm is used, and the titanium oxide is subjected to dispersion treatment, thereby adjusting them to the range of the secondary particle diameter defined in present invention. More preferably, titanium oxide having a primary particle diameter of 180 to 240 nm is used, and even most preferably, titanium oxide having a primary particle diameter of 200 to 230 nm is used.

The content of titanium oxide in the white ink is preferably from 15 to 30% by weight with reference to the total weight of the white ink. If the content of titanium oxide is too low, obtaining sufficient hiding property is hard. On the other hand, if the content is too high, storage stability tends to deteriorate. Regarding this, the content of titanium oxide in the white ink of the present invention is adjusted within the above-described range, so that high hiding property is achieved even if the thickness of the printed material is small, and high storage stability of the ink is maintained. The content of titanium oxide is preferably from 17 to 25% by weight, and more preferably from 19 to 23% by weight with reference to the total weight of the white ink.

The titanium oxide used in the present invention may be of anatase or rutile type. Titanium oxide of rutile type is preferred, because it makes it easy to improve the hiding property of the printed material. In addition, the titanium oxide to be used may be prepared by any method such as chlorine method or sulfuric acid method. The titanium oxide prepared by chlorine method is preferred for improving whiteness of the printed material.

In one preferred embodiment of the present invention, the use of surface-treated titanium oxide is preferred. The surface treatment may be carried out using a surface-treating agent, and the surface-treating agent may be inorganic or organic. The treatment with the surface-treating agent makes it easy to reduce catalytic activity and control hydrophilicity on the surface of titanium oxide. In addition, weather resistance and dispersion stability of the ink are readily improved. Examples of the inorganic surface-treating agent include aluminum compounds including aluminum hydroxide and alumina, silica, zirconia, tin, antimony, and titanium. Examples of the organic surface-treating agent include polyalcohols, alkanolamines, organosilicon compounds, organic phosphate compounds, and higher fatty acids.

As an embodiment of the white pigment, titanium oxide whose surface is treated with aluminum and/or silica is preferred. Of these embodiments, titanium oxide whose surface is treated with aluminum and silica is more preferred. As is evident from the below-described example, in particular, the embodiment including the combination of a basic dispersant and titanium oxide whose surface is treated with silica tends to more highly improve dispersion stability and pigment sedimentation properties than other embodiments. Therefore, according to the embodiment of the white ink including the titanium oxide whose surface is treated with at least silica, decap property during printing are readily improved.

Commonly, titanium oxide whose surface is treated with silica is known to have acidic hydroxyl groups on particle surface thereof. Therefore, the combination of the titanium oxide and a basic dispersant forms intermolecular interaction such as a hydrogen bond between them. Although not bound by any theory, such intermolecular interaction likely improves adsorption between the titanium oxide and basic dispersant, and makes it easy to control the sedimentation of titanium oxide. In addition, for the same reason, among the titanium oxide treated with the above-described organic surface-treating agent, the titanium oxide treated with a polyalcohol, alkanolamine, or organosilicon compound is particularly preferred, because it has neutral hydroxyl groups on particle surface thereof.

From these viewpoints, in one embodiment of the present invention, the titanium oxide is more preferably treated with a surface-treating agent, and the treated surface has hydroxyl groups. The hydroxyl groups are classified into acidic, neutral, and basic according to the surface-treating agent used. In the present invention, from the viewpoint of interaction with the basic dispersant, the hydroxyl groups are preferably acidic and neutral, and more preferably acidic.

In one embodiment of the present invention, the titanium oxide having a weight average particle diameter of 180 to 250 nm, or a primary particle diameter of 150 to 250 nm is preferably used. Such titanium oxide is commercially available. Examples include TIPAQUE CR-60, CR-60-2, CR-63, CR-67, PF-690, PF-691, PF-726, and PF-728 manufactured by Ishihara Sangyo Kaisha, Ltd; KRONOS 2064, 2160, 2190, 2220, 2300, and 2310 manufactured by KRONOS Worldwide Inc. Among them, TIPAQUE CR-63, CR-80, PF-690, PF-691, PF-726, PF-728, KRONOS 2220, and 2310 are preferred, all of which are titanium oxide having hydroxyl groups on the treated surface.

(Pigment Dispersant)

The white ink of the present invention preferably contains a pigment dispersant. The use of an appropriate pigment dispersant improves pigment dispersibility and ink storage stability, and makes it easy to prevent sedimentation of the pigment. In one embodiment of the present invention, a basic dispersant is preferably used from the viewpoints of affinity with the ink constituents, and storage stability. In addition, from the viewpoint of affinity with the ink constituents, it is particularly preferred that a pigment dispersant of resin type be used. Specific examples of the pigment dispersant of resin type include polymeric dispersants having a main skeleton such as polyurethane skeleton, polyacryl skeleton, polyester skeleton, polyamide skeleton, polyimide skeleton, and polyurea skeleton. From the viewpoint of storage stability of the ink, a polymeric dispersant having at least one selected from a polyurethane skeleton, a polyacryl skeleton, and a polyester skeleton is preferred. The structure of the polymeric dispersant is not particularly limited. For example, the structure may be a random structure, a block structure, a comb structure, or a star structure. From the viewpoint of storage stability of the ink, a polymeric dispersant having a block structure or a comb structure is preferred.

The weight average molecular weight of the pigment dispersant used in the present invention is preferably 1000 or more and 70000 or less. The molecular weight is more preferably 2000 or more and 60000 or less, and particularly preferably 3000 or more and 50000 or less. When the molecular weight is adjusted within this range, pigment dispersibility is improved while keeping the ink viscosity low, and further pigment sedimentation is readily prevented.

Specific examples of the pigment dispersant used in the present invention are listed below:

wetting dispersants manufactured by BYK-Chemie, including DISPER BYK 101, 102, 103, 106, 108, 109, 110, 111, 112, 116, 130, 140, 142, 145, 161, 162, 163, 164, 166, 167, 168, 170, 171, 174, 180, 182, 183, 184, 185, 2000, 2001, 2020, 2050, 2070, 2096, and 2150; BYK JET 9130, 9131, 9132, 9133, and 9150; and LP-N-22252;

EFKA series manufactured by Ciba Specialty Chemicals, including 4008, 4009, 4010, 4015, 4020, 4046, 4047, 4050, 4055, 4060, 4080, 4300, 4330, 4340, 4400, 4401, 4402, 4403, 4406, 4800, 5010, 5044, 5054, 5055, 5063, 5064, 5065, 5066, 5070, and 5244;

Solsperse series manufactured by The Lubrizol Corporation, including 3000, 11200, 13240, 13650, 13940, 16000, 17000, 18000, 20000, 21000, 24000SC, 24000GR, 26000, 28000, 31845, 32000, 32500, 32550, 32600, 33000, 34750, 35100, 35200, 36000, 36600, 37500, 38500, 39000, 41000, 53000, 53095, 54000, 55000, 56000, 71000, 76400, 76500, J100, and J200;

DISPARLON series manufactured by Kusumoto Chemicals, Ltd., including 1210, 1220, 1831, 1850, 1860, 2100, 2150, 2200, 7004, KS-260, KS-273N, KS-860, KS-873N, PW-36, DN-900, DA-234, DA-325, DA-375, DA-550, DA-1200, DA-1401, and DA-7301;

AJISPER series manufactured by Ajinomoto Fine-Techno Co., Inc., including PB-711, PB-821, PB-822, PB-824, PB-827, PB-711, PN-411, and PA-111.

In one embodiment of the present invention, DISPER-BYK 162, 167, 168, and LP-N-22252; Solsperse 24000SC, 24000GR, 32000, 33000, 35000, 39000, 76400, 76500, J100, and J200; and AJISPER PB-821, 822, 824, and 827 are preferred. All of them are dispersants of basic resin type.

The content of the pigment dispersant is not particularly limited, and may be freely adjusted as long as desired stability is achieved. In one embodiment of the present invention, it is preferred that titanium oxide treated with a surface-treating agent, and having hydroxyl groups on the treated surface be used as a white pigment. In this embodiment, in order to sufficiently achieve the above-described effect of intermolecular interaction using a basic resin dispersant as the pigment dispersant, it is important to appropriately adjust the mixing ratio between the titanium oxide and pigment dispersant. Accordingly, in one embodiment of the present invention, from the viewpoints of pigment dispersibility, storage stability of the ink, and decap property, the proportion of the active ingredients of the pigment dispersant is preferably from 2 to 10 parts by weight with reference to 100 parts by weight of titanium oxide. When the mixing ratio is adjusted within this range, pigment dispersibility is good, pigment sedimentation is inhibited even if the standing time after printing is prolonged, and nozzle void hardly occurs. On the other hand, if the content of the pigment dispersant in the ink is too small, it is difficult to maintain dispersion stability of the pigment, and pigment flocculation tends to occur. In addition, if the content of the pigment dispersant is too high, ink flowability deteriorates, and ejection property may be influenced. For this reason, in one embodiment of the present invention, the content of the pigment dispersant is preferably from 3 to 8 parts by weight, and more preferably from 4 to 7 parts by weight with reference to 100 parts by weight of titanium oxide.

(Polymerizable Compound)

The white ink of the present invention may use a polymerizable compound well known to the technical field. The polymerizable compound may be any compound as long as it has at least one polymerizable functional group in a molecule, and such compounds may be used in combination. Although not specifically limited, in one embodiment, the ink preferably includes at least one of the compounds represented by the general formulae (1) and (2). These specific compounds have a low viscosity, and thus can decrease the ink viscosity. Therefore, the use of the compound makes readily improves the ink ejection performance. In addition, reduction of the ink viscosity allows the increase of the content of the pigment and polymerization initiator. Accordingly, the use of the compound allowed the improvement of the hiding property and curability of the printed material.

General formula (1)

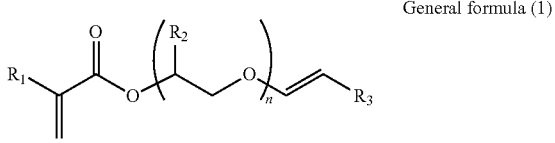

In the formula, R1 and R2 are each independently a hydrogen atom or a methyl group, R3 is a hydrogen atom or an alkyl group with 1 to 10 carbon atoms, and n represents an integer of 1 to 10. R3 is preferably a hydrogen atom, and n is preferably 1 or 2. If n is greater than 10, the polymerizable compound has a high viscosity, which may makes it difficult to obtain an ink with a low viscosity.

General formula (2)

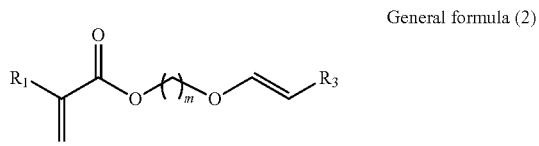

In the formula, R1 is a hydrogen atom or a methyl group, R3 is a hydrogen atom or an alkyl group with 1 to 10 carbon atoms, and m represent an integer of 1 to 10. R3 is preferably a hydrogen atom. If m is greater than 10, the polymerizable compound has a high viscosity, which may makes it difficult to obtain an ink with a low viscosity.

Specific examples of the polymerizable compounds represented by the general formulae (1) and (2) include vinyloxyethyl (meth)acrylate, vinyloxydiethylene glycol (meth)acrylate, vinyloxytriethylene glycol (meth)acrylate, vinyloxypropylene glycol (meth)acrylate, vinyloxydipropylene glycol (meth)acrylate, vinyloxytripropylene glycol (meth)acrylate, vinyloxymethyl(meth)acrylate, vinyloxybutyl (meth)acrylate, vinyloxyhexyl (meth)acrylate, vinyloxyoctyl (meth)acrylate, and vinyloxydecyl (meth)acrylate. Among them, vinyloxyethyl (meth)acrylate, vinyloxydiethylene Glycol (meth)acrylate, vinyloxypropylene glycol (meth)acrylate, and vinyloxybutyl (meth)acrylate are preferred. In one embodiment, vinyloxyethyl (meth)acrylate and vinyloxypropylene glycol (meth)acrylate are more preferred, and vinyloxyethyl (meth)acrylate is most preferred. According to another embodiment, vinyloxydiethylene glycol (meth)acrylate is preferred, and vinyloxydiethylene glycol acrylate (VEEA) is most preferred. VEEA is a compound represented by the formula (1), wherein R1 to R3 are hydrogen atoms, and n=2.

The content of the specific compounds represented by the general formulae (1) and (2) is preferably from 10 to 50% by weight, more preferably from 15 to 45% by weight, and most preferably from 20 to 40% by weight with reference to the total weight of the ink. When the content of the specific compounds is adjusted within this range, the ink viscosity ink is readily decreased while a storage stability of the ink is maintained. Furthermore, as a result of this, ejection performance of the ink is readily improved. When the content of the specific compound in the ink is 10% by weight or more, ink viscosity is readily decreased, and as a result of this, ejection performance of the ink is improved. On the other hand, when the content is 50% by weight or less, the pigment dispersant in the ink dissolves, and as a result of this, the problem of deficiency of the amount of the pigment dispersant to titanium oxide is avoided. Accordingly, marked storage stability of the ink is readily achieved.

According to another embodiment, the polymerizable compound may be a combination of a monofunctional monomer and a polyfunctional monomer. The monofunctional monomer means a compound having only one polymerizable functional group in a molecule. The polyfunctional monomer means a compound having two or more polymerizable functional groups in a molecule. However, in the present description, the specific compounds represented by the general formulae (1) and (2) are not included. According to yet another embodiment, the polymerizable compound may be a combination of a monofunctional monomer, a polyfunctional monomer, and specific compounds represented by the general formulae (1) and (2).

Specific examples of the monofunctional monomer include benzyl (meth)acrylate, (ethoxylated (or propoxylated))-2-phenoxyethyl (meth)acrylate, dicyclopentenyl (oxyethyl) (meth)acrylate, 2-methoxyethyl (meth)acrylate, methoxy triethylene glycol (meth)acrylate, 2-ethoxyethyl (meth)acrylate, ethoxy ethoxyethyl (meth)acrylate, methoxy dipropylene glycol (meth)acrylate, β-carboxylethyl (meth)acrylate, trimethylolpropane formal (meth)acrylate, isoamyl (meth)acrylate, cyclohexyl (meth)acrylate, tetrahydrofurfuryl (meth)acrylate, isoboronyl (meth)acrylate, dicyclopentanyl (meth)acrylate, isooctyl (meth)acrylate, lauryl (meth)acrylate, 2-hydroxy-3-phenoxy propyl (meth)acrylate, 1,4-cyclohexane dimethanol (meth)acrylate, 2-hydroxyethyl (meth)acrylate, 2-hydroxypropyl (meth)acrylate, 4-hydroxybutyl (meth)acrylate, acryloyl morpholine, N-vinyl caprolactam, N-vinylpyrrolidone, N-vinylformamide, and N-acryloyl oxyethyl hexahydrophthalimide.

Specific examples of the polyfunctional monomer include dimethylol-tricyclodecane di(meth)acrylate, (ethoxylated (or propoxylated)) bisphenol A di(meth)acrylate, cyclohexane dimethanol di(meth)acrylate, (poly)ethylene glycol di(meth)acrylate, (ethoxylated (or propoxylated)) 1,6-hexanediol di(meth)acrylate, 1,9-nonanediol di(meth)acrylate, 1,10-decanediol di(meth)acrylate, (ethoxylated (or propoxylated)) neopentyl glycol di(meth)acrylate, hydroxypivalic acid neopentyl glycol di(meth)acrylate, dipropylene glycol di(meth)acrylate, (neopentyl glycol-modified) trimethylolpropane di(or tri)(meth)acrylate, tripropylene glycol di(meth)acrylate, dicyclopentanyl di(meth)acrylate, pentaerythritol tri(or tetra) (meth)acrylate, ditrimethylolpropane tri(or tetra)(meth)acrylate, tetramethylol methane tri(or tetra)(meth)acrylate, and dipentaerythritol hexa(meth)acrylate.

In one embodiment, the monofunctional monomer is preferably at least one selected from the group consisting of phenoxyethyl acrylate, ethoxy ethoxyethyl acrylate, isobornoryl acrylate, isooctyl acrylate, lauryl acrylate, and N-vinyl caprolactam. In addition, the polyfunctional monomer is preferably at least one selected from the group consisting of (ethoxylated (or propoxylated)) neopentyl glycol diacrylate, 1,6-hexanediol diacrylate, 1,9-nonanediol diacrylate, 1,10-decanediol diacrylate, dipropylene glycol diacrylate, and tripropylene glycol diacrylate. Furthermore, in terms of ink curability and odor, the use of at least one selected from the group consisting of lauryl acrylate, dipropylene glycol diacrylate, N-vinyl caprolactam, 1,9-nonanediol diacrylate, and 1,10-decanediol diacrylate is more preferred.

In the present invention, the whole composition of the polymerizable compound is not particularly limited. However, in the whole composition, if the proportion of the monofunctional monomer is too high, ink curability may decrease. Therefore, in one embodiment, with reference to the total weight of the polymerizable compound, the total content of the polyfunctional monomer and/or the specific compounds represented by the general formulae (1) and (2) is preferably 70% by weight or more. The total content is more preferably 80% by weight or more, and even more preferably 90% by weight or more. In one embodiment, with reference to the total weight of the polymerizable compound, the specific compounds represented by the general formulae (1) and (2) is more preferably 70% by weight or more. When the content of the specific compound is 70% by weight or more, reduction of the ink viscosity, and improvement of ejection stability are readily achieved. In either embodiment, the content of the polymerizable compound in the ink is preferably from 50 to 80% by weight, more preferably from 55 to 75% by weight, and most preferably from 60 to 70% by weight. When the content of the polymerizable compound is adjusted within this range, the ink viscosity is maintained at an appropriate value, and ejection stability is readily improved.

The white ink of the present invention may further include, in addition to the above-described constituent, other components known to the well-known in the art. For example, in one embodiment, an oligomer and/or a prepolymer may be used. Specific examples include, but not limited to, the followings.

"Ebecryl 230, 244, 245, 270, 280/151B, 284, 285, 4830, 4835, 4858, 4883, 8402, 8803, 8800, 254, 264, 265, 294/35HD, 1259, 1264, 4866, 9260, 8210, 1290, 1290K, 5129, 2000, 2001, 2002, 2100, KRM7222, KRM7735, 4842, 210, 215, 4827, 4849, 6700, 6700-20T, 204, 205, 6602, 220, 4450, 770, IRR567, 81, 84, 83, 80, 657, 800, 805, 808, 810, 812, 1657, 1810, IRR302, 450, 670, 830, 835, 870, 1830, 1870, 2870, IRR267, 813, IRR483, 811, 436, 438, 446, 505, 524, 525, 554W, 584, 586, 745, 767, 1701, 1755, 740/40TP, 600, 601, 604, 605, 607, 608, 609, 600/25TO, 616, 645, 648, 860, 1606, 1608, 1629, 1940, 2958, 2959, 3200, 3201, 3404, 3411, 3412, 3415, 3500, 3502, 3600, 3603, 3604, 3605, 3608, 3700, 3700-20H, 3700-20T, 3700-25R, 3701, 3701-20T, 3703, 3702, RDX63182, 6040, IRR419" manufactured by Daicel-UCB Company, Ltd.;

"CN104, CN120, CN124, CN136, CN151, CN2270, CN2271E, CN435, CN454, CN970, CN971, CN972, CN9782, CN981, CN9893, and CN991" manufactured by Sartomer Company, Inc.;

"Laromer EA81, LR8713, LR8765, LR8986, PE56F, PE44F, LR8800, PE46T, LR8907, P043F, P077F, PE55F, LR8967, LR8981, LR8982, LR8992, LR9004, LR8956, LR8985, LR8987, UP35D, UA19T, LR9005, P083F, P033F, P084F, P094F, LR8863, LR8869, LR8889, LR8997, LR8996, LR9013, LR9019, P09026V, and PE9027V" manufactured by BASF;

"Photomer 3005, 3015, 3016, 3072, 3982, 3215, 5010, 5429, 5430, 5432, 5662, 5806, 5930, 6008, 6010, 6019, 6184, 6210, 6217, 6230, 6891, 6892, 6893-20R, 6363, 6572, and 3660" manufactured by Cognis Corporation;

"Art-Resin UN-9000HP, 9000PEP, 9200A, 7600, 5200, 1003, 1255, 3320HA, 3320HB, 3320HC, 3320HS, 901T, 1200TPK, 6060PTM, and 6060P" manufactured by Negami Chemical Industrial Co., Ltd.;

"Shiko UV-6630B, 7000B, 7510B, 7461TE, 3000B, 3200B, 3210EA, 3310B, 3500BA, 3520TL, 3700B, 6100B, 6640B, 1400B, 1700B, 6300B, 7550B, 7605B, 7610B, 7620EA, 7630B, 7640B, 2000B, 2010B, 2250EA, and 2750B" manufactured by Nippon Synthetic Chemical Industry Co., Ltd.;

"KAYARAD R-280, R-146, R131, R-205, EX2320, R190, R130, R-300, C-0011, TCR-1234, ZFR-1122, UX-2201, UX-2301, UX3204, UX-3301, UX-4101, UX-6101, UX-7101, MAX-5101, MAX-5100, MAX-3510, and UX-4101" manufactured by Nippon Kayaku Co., Ltd.; and the like.

When any of these oligomer and/or prepolymer component is used, the content of the component is preferably less than 10% by weight, and more preferably less than 5% by weight, with reference to the total weight of the ink.

(Polymerization Initiator)

In one embodiment of the present invention, the active energy rays applied to the white ink are preferably light energy containing ultraviolet ray. In this embodiment, it is preferable that the above-described constituents of the white ink further include a polymerization initiator. The polymerization initiator is not particularly limited, and may be appropriately selected from the compounds known in the technical field, in consideration of the curing rate and physical properties of the cured coating film. In one embodiment, a molecule-cleaving or hydrogen-withdrawing polymerization initiator is preferred. Specific examples of the polymerization initiator include benzoin isobutyl ether, 2,4-diethylthioxanthone, 2-isopropylthioxanthone, 2,4,6-trimethylbenzoyl diphenyl phosphine oxide, 2-benzyl-2-dimethylamino-1-(4-morpholinophenyl)-butane-1-one, bis(2,4,6-dimethoxybenzoyl)-2,4,4-trimethylpentylphosphine oxide, bis(2,4,6-trimethylbenzoyl) phenylphosphine oxide, 2-methyl-1-(4-methylthio phenyl)-2-morpholinopropane-1-one, oligo(2-hydroxy-2-methyl-1-(4-(1-methylvinyl)phenyl)propanone), 4-benzoyl-4'-methyl-diphenyl sulfide, 1,2-octanedione, and 1-(4-(phenylthio)-2,2-(O-benzoyloxime)). These polymerization initiators are preferred because their radical formation reaction will not be inhibited by light absorption of a pigment and a polymerizable compound, and their high radical generation efficiency improves ink curability. The content of the polymerization initiator is preferably from 3 to 20% by weight, and more preferably from 5 to 15% by weight with reference to the total weight of the ink.

Other specific examples of the polymerization initiator include molecule-cleaving polymerization initiators such as 1-hydroxycyclohexylphenyl ketone, benzoin ethyl ether, benzyl dimethylketal, 2-hydroxy-2-methyl-1-phenylpropane-1-one, and 1-(4-isopropyl phenyl)-2-hydroxy-2-methylpropane-1-one. In addition, they include hydrogen-withdrawing polymerization initiators such as benzophenone, 4-phenylbenzophenone, and isophthalphenone.

Among the above-listed polymerization initiators, at least one selected from the group consisting of 2,4,6-trimethylbenzoyldiphenylphosphine oxide, bis(2,4,6-trimethylbenzoyl)phenylphosphine oxide, and 4-benzoyl-4'-methyldiphenyl sulfide is preferred. These polymerization initiators are preferred because they have high curability, and will not yellow the cured ink film. The ink of the present invention includes one, preferably two of the above-listed polymerization initiators. In particular, the use of the combination of 2,4,6-trimethylbenzoyldiphenylphosphine oxide and 4-benzoyl-4'-methyldiphenyl sulfide is preferred. In a more preferred embodiment, the mixing ratio of 2,4,6-trimethylbenzoyldiphenylphosphine oxide and 4-benzoyl-4'-methyldiphenyl sulfide is from 2:1 to 5:1. In this embodiment, the total content of the polymerization initiator is preferably from 10 to 20% by weight with reference to the total weight of the ink.

(Sensitizer)

In one embodiment of the white ink of the present invention, the polymerization initiator may be combined with a sensitizer. When the polymerization initiator and a sensitizer are used in combination, the sensitizer is preferably an amine which will not cause addition reaction with the polymerizable compound. Examples of the sensitizer useful in the present invention include trimethylamine, methyldimethanol amine, triethanolamine, p-diethylaminoacetophenone, ethyl-4-(dimethylamino)-benzoate, Isoamyl p-(dimethylamino)-benzoate, N,N-dimethylbenzylamine, and 4,4T-bis(diethylamino)benzophenone. These sensitizers may yellow the cured ink film, and thus are preferably used in an amount which will not cause yellowing.

(Organic Solvent)

In one embodiment of the white ink of the present invention, the use of an organic solvent is preferred. The use of an organic solvent makes it easy to decrease the ink viscosity, and allows the improvement of ejection property. Examples of the organic solvent include glycol monoacetate compounds such as ethylene glycol monobutyl ether acetate, diethylene glycol monoethyl ether acetate, diethylene glycol monobutyl ether acetate; glycol ether compounds such as diethyleneglycol dimethyl ether, diethylene glycol methyl ethyl ether, diethylene glycol diethyl ether, and tetraethylene glycol dimethyl ether; and lactate compounds such as ethyl lactate, and butyl lactate. Among them, ethylene glycol monobutyl ether acetate, diethylene glycol monobutyl ether acetate, diethylene glycol methyl ethyl ether, diethylene glycol diethyl ether are preferred, and diethylene glycol methyl ethyl ether, diethylene glycol diethyl ether are more preferred.

The content of the organic solvent is preferably from 0.01 to 5% by weight with reference to the total weight of the ink. When the content is 0.01% by weight or more, ejection property tends to be good. In addition, when the content is 5% by weight or less, ejection is stably carried out without deterioration of the decap property caused by drying of the organic solvent. The content is more preferably from 0.1 to 3% by weight, and even more preferably from 0.5 to 2% by weight.

(Surface Conditioner)

In one embodiment of the white ink of the present invention, the use of a surface conditioner is preferred, thereby improving spreadability on the base material. The surface conditioner may be any compound known in the technical field, and may be appropriately selected from acrylic, silicon, and fluorine compounds. Specific examples of the surface conditioner include, but not limited to, BYK-350, 352, 354, 355, 358N, 361N, 381N, 381, 392, BYK-300, 302, 306, 307, 310, 315, 320, 322, 323, 325, 330, 331, 333, 337, 340, 344, 370, 375, 377, 355, 356, 357, 390, UV3500, UV3510, and UV3570 manufactured by BYK-Chemie. Other examples include Tegoglide-100, 110, 130, 420, 432, 435, 440, 450GZ400, Tegorad-2100, 2200, 2250, 2500, and 2700 manufactured by Evonik Degussa GmbH. These surface conditioners may be used singly or in combination of two or more thereof according to the intended use.

The content of the surface conditioner is preferably from 0.01 to 5% by weight with reference to the total weight of the ink. When the content is 0.01% by weight or more, spreadability tends to be good. On the other hand, when the content is 5% by weight or less, storage stability of the ink tend to be better. The content is more preferably from 0.05 to 3% by weight.

(Stabilizer)

In one embodiment of the white ink of the present invention, the use of a stabilizer is preferred. The use of a stabilizer improves viscosity stability of the ink over time, and on-machine viscosity stability in the recording apparatus. The stabilizer useful in the present invention is not particularly limited. In one preferred embodiment, at least one selected from the group consisting of hindered phenol compounds, phenothiazine compounds, hindered amine compounds, and phosphorus compounds may be used. Specific examples of the stabilizer are listed below.

Hindered phenol compounds: "IRGANOX 1010, 1010FF, 1035, 1035FF, 1076, 1076FD, 1076DWJ, 1098, 1135, 1330, 245, 245FF, 245DWJ, 259, 3114, 565, 565DD, and 295" manufactured by BASF; "BHT SWANOX", "NONFLEX Alba, MBP, EBP, CBP, BB", "TBH" manufactured by Seiko Chemical Co., Ltd., "AO-20, 30, 50, 50F, 70, 80, and 330" manufactured by ADEKA Corporation; "H-BHT" manufactured by Honshu Chemical Industry Co., Ltd., and "Yoshinox BB, 425, and 930" manufactured by API Corporation.

Phenothiazine compounds: "Phenothiazine" manufactured by Seiko Chemical Co., Ltd.; "Phenothiazine", "2-methoxyphenothiazine", and "2-cyanophenothiazine" manufactured by Sakai Chemical Industry Co., Ltd.

Hindered amine compounds: "IRGANOX 5067" "TINUVIN 144, 765, 770DF, and 622LD" manufactured by BASF; "NONFLEX H, F, OD-3, DCD, and LAS-P", "STEARER STAR", "diphenylamine", "4-aminodiphenylamine", and "4-oxydiphenylamine" manufactured by Seiko Chemical Co., Ltd.; "HOTEMPO" manufactured by Evonik Degussa GmbH; "Fancryl 711MM and 712HM" manufactured by Hitachi Chemical Co., Ltd.

Phosphorus compounds: "triphenylphosphine", "IRGAFOS 168 and 168FF" manufactured by BASF; and "NONFLEX TNP" manufactured by Seiko Chemical Co., Ltd.

Other compounds: "IRGASTAB UV-10 and 22" manufactured by BASF; "Hydroquinone", "Metokinon", "Torukinon", "NH", "PBQ", "TBQ", and "2,5-diphenyl-p-benzoquinone" manufactured by Seiko Chemical Co., Ltd.; "Q-1300 and 1301" manufactured by Wako Pure Chemical Industries, Ltd.; and "GENORAD 16, 18, and 20" manufactured by RAHN AG.

Among the above-listed compounds, the following compounds are preferred from the viewpoints of solubility in the ink and color of the stabilizer.

Hindered phenol compounds: "BHT Swanox", "NONFLEX Alba" manufactured by Seiko Chemical Co., Ltd.; "H-BHT" manufactured by Honshu Chemical Industry Co., Ltd.

Phenothiazine compounds: "Phenothiazine" manufactured by Seiko Chemical Co., Ltd.; "Phenothiazine" manufactured by Sakai Chemical Industry Co., Ltd.

Hindered amine compounds: "HO-TEMPO" manufactured by Evonik Degussa GmbH.

Phosphorus compounds: "Triphenyl phosphine" manufactured by BASF.

The content of the stabilizer is preferably from 0.01 to 5% by weight with reference to the total weight of the ink. If the content is below this range, ink stability may be poor. On the other hand, if the content is above this range, ink curing may be hindered.

The white ink of the present invention may be prepared by a method well known in the technical field. In one embodiment, the white ink may be prepared as follows: titanium oxide, a pigment dispersing resin, and a polymerizable monomer are uniformly mixed and dispersed to make a pigment dispersion, and then other constituents such as a polymerizable monomer and a polymerization initiator are added to the dispersion, and uniformly mixed. This dispersion treatment may be carried out by, for example, a wet bead mill using a pulverization medium. The pulverization medium is preferably zirconia beads. The diameter of the beads used as the pulverization medium is preferably from 0.1 to 1 mm, and more preferably from 0.3 to 0.5 mm. In addition, the polymerizable monomer used for dispersion treatment is preferably vinyloxydiethylene glycol acrylate or dipropylene Glycol diacrylate. In one embodiment, the ink thus obtained is preferably filtrated through a filter.

(Ink Properties)

The white ink of the present invention is intended to be used for printing on the ink-jet printing system. Therefore, the ink preferably has a viscosity suitable for achieving stable ejection property at the temperature during ink ejection. In one embodiment, the ink viscosity at 25° C. is preferably adjusted to 5 to 50 mPa·s. When the ink viscosity is adjusted within this range, in particular, stable ejection property is achieved when an ordinary head having a frequency of 5 to 30 KHz. Ejection followability is readily improved by adjusting the viscosity to 5 mPa·s or more. On the other hand, when the viscosity is adjusted to 50 mPa·s or less, good ejection stability is readily obtained. If the ink viscosity is beyond the above-described range, ejection property tends to deteriorate even if a viscosity-decreasing mechanism by heating is incorporated into the head, and ejection stability decreases, which may result in total failure of ejection. The ink viscosity can be adjusted by appropriately changing the mixing ratio of the constituents of the ink. In one embodiment, the ink viscosity at 25° C. is more preferably adjusted to 7 to 14.5 mPa·s, and particularly preferably adjusted to 8.5 to 13 mPa·s. Stable ejection property is readily achieved by adjusting the ink viscosity within this range when using an ordinary head having a frequency of 5 to 30 KHz, and also when using a head with a high frequency of 10 to 50 KHz.

The white ink of the present invention is suitable to the ink-jet printing system, particularly to the single-pass system (hereinafter referred to as "single-pass ink-jet printing system"). The single-pass ink-jet printing system accomplishes printing on the base material to be printed in one time, and is suitable for business printing required to achieve a high printing speed. Under this system, only one time of printing is carried out for one color, so that an ink with a high pigment concentration which can achieve a sufficient concentration in one time of printing is required. In addition, different from the shuttle-type multi-pass ink-jet printing system, a fixed ink-jet head is frequently used under the single-pass ink-jet printing system. Under the multi-pass system, cleaning is periodically carried out in a short period, but under the single system, the frequency of cleaning is about once in every several hours, and the frequency is low. Therefore, in particular, the single-pass ink-jet printing system requires an ink having high printing stability and superior decap property. Under such circumstances, prior art ink tends to cause the decrease of printing stability and decap property with the increase of the pigment concentration, so that it is difficult to satisfy the demand. On the other hand, the white ink of the present invention achieves high decap property, and prevents the occurrence of nozzle void even if cleaning is not carried out for a long time. Therefore, the use of the white ink of the present invention allows satisfactory printing on the single-pass ink-jet printing system over a long time.

An alternative embodiment of the present invention relates to a printing method on the ink-jet printing system using the above-described white ink. One embodiment of the printing method includes a step of ejecting the droplets of a white ink from an ink-jet head on a printing base material, and forming a coating film of the white ink on the printing base material, a step of irradiating the coating film with active energy rays to cure the coating film, thereby forming a printed surface. The ink-jet head may be a fixed head typically used under the single-pass ink-jet printing system. In addition, the amount of the ink solution droplets ejected from the ink-jet head may be 20 picoliter or less. According to the present invention, the printed material has high hiding property even if the ejection volume is 20 picoliter or less.

The printing base material used in the present invention is not particularly limited. Examples of the printing base material include plastic base materials such as polycarbonate, hard vinyl chloride, soft vinyl chloride, polystyrene, styrofoam, PMMA, polypropylene, polyethylene, and PET. The printing base material may be a combination or modified product of various plastic base materials. Other examples include paper base materials such as fine paper, art paper, coated paper, and cast-coated paper, and metal base materials such as glass and stainless steel. In particular, the white ink of the present invention has high hiding property, so that is suitable to transparent base materials and color base materials other than white base materials.

EXAMPLES

The present invention is more specifically described below based on examples and comparative examples. Unless otherwise noted, "part" and "%" means "part by weight" and "% by weight", respectively.

1. Preparation of Pigment Dispersion (Pigment Dispersion A)

50 parts of TIPAQUE CR-60 (titanium oxide treated with aluminum, primary particle diameter 210 nm, manufactured by Ishihara Sangyo Kaisha, Ltd.) as a pigment, 2.5 parts of DISPER BYK-111 (acidic dispersant, acid value 129 mmg KOH/g, manufactured by BYK-Chemie) as a pigment dispersant, and 47.5 parts of dipropylene glycol diacrylate were placed in a disperser, and these components were mixed for preliminary dispersion. Subsequently, these components were subjected to main dispersion for 2 hours using a 0.6-L DYNO mill filled with 1800 g of zirconia beads having a diameter of 1 mm, thereby obtaining a pigment dispersion A.

(Pigment Dispersion B1)

A pigment dispersion B1 was obtained in the same manner as in the pigment dispersion operation for the pigment dispersion A, except that SOLSPERSE 32000 (basic dispersant, acid value 24, 8 mmg KOH/g, amine value 27, 1 mmg KOH/g, manufactured by The Lubrizol Corporation) was used as a pigment dispersing resin.

(Pigment Dispersion B2)

A pigment dispersion B2 was obtained in the same manner as the pigment dispersion B1, except that dipropylene glycol diacrylate in the pigment dispersion B1, was replaced with vinyloxydiethylene glycol acrylate.

(Pigment Dispersion C1)

A pigment dispersion C1 was obtained in the same manner as in the pigment dispersion operation for the pigment dispersion A, except that TIPAQUE PF-726 (titanium oxide treated with aluminum/silica, primary particle diameter 210 nm, manufactured by Ishihara Sangyo Kaisha, Ltd.) as the pigment, and SOLSPERSE 32000 (basic dispersant, manufactured by The Lubrizol Corporation) was used as the pigment dispersing resin.

(Pigment Dispersion C2)

A pigment dispersion C2 was obtained in the same manner as in the pigment dispersion operation for the pigment dispersion C1, except that dipropylene glycol diacrylate in the pigment dispersion C1, was replaced with vinyloxydiethylene glycol acrylate.

(Pigment Dispersion D)

A pigment dispersion D was obtained in the same manner as in the pigment dispersion operation for the pigment dispersion A, except that TIPAQUE A-220 (titanium oxide treated with aluminum, primary particle diameter 160 nm, manufactured by Ishihara Sangyo Kaisha, Ltd.) as the pigment, and SOLSPERSE 32000 (basic dispersant, manufactured by The Lubrizol Corporation) was used as the pigment dispersing resin.

(Pigment Dispersion E)

A pigment dispersion E was obtained in the same manner as in the pigment dispersion operation for the pigment dispersion A, except that TIPAQUE CR-58 (titanium oxide treated with aluminum, primary particle diameter 280 nm, manufactured by Ishihara Sangyo Kaisha, Ltd.) as the pigment, and SOLSPERSE 32000 (basic dispersant, manufactured by The Lubrizol Corporation) was used as the pigment dispersing resin.

(Pigment Dispersion F)

A pigment dispersion F was obtained in the same manner as in the pigment dispersion operation for the pigment dispersion A, except that TIPAQUE CR-80 (titanium oxide treated with aluminum/silica, primary particle diameter 250 nm, manufactured by Ishihara Sangyo Kaisha, Ltd.) as the pigment, and SOLSPERSE 32000 (basic dispersant, manufactured by The Lubrizol Corporation) was used as the pigment dispersing resin.

(Pigment Dispersion G)

A pigment dispersion C was obtained in the same manner as in the pigment dispersion operation for the pigment dispersion A, except that TIPAQUE CR-60-2 (titanium oxide treated with aluminum/polyalcohol, primary particle diameter 210 nm, manufactured by Ishihara Sangyo Kaisha, Ltd.) as the pigment, and SOLSPERSE 32000 (basic dispersant, manufactured by The Lubrizol Corporation) was used as the pigment dispersing resin.

(Pigment Dispersion H)

A pigment dispersion H was obtained in the same manner as in the pigment dispersion operation for the pigment dispersion A, except that TIPAQUE PF-690 (titanium oxide treated with aluminum/silica/polyalcohol, primary particle diameter 210 nm, manufactured by Ishihara Sangyo Kaisha, Ltd.) as the pigment, and SOLSPERSE 32000 (basic dispersant, manufactured by The Lubrizol Corporation) was used as the pigment dispersing resin.

(Pigment Dispersion I)

A pigment dispersion I was obtained in the same manner as in the pigment dispersion operation for the pigment dispersion A, except that KRONOS2064 (titanium oxide treated with aluminum/organic substance, primary particle diameter 200 nm, manufactured by KRONOS International Inc.) as the pigment, and SOLSPERSE 32000 (basic dispersant, manufactured by The Lubrizol Corporation) was used as the pigment dispersing resin.

(Pigment Dispersion J)

A pigment dispersion J was obtained in the same manner as in the pigment dispersion operation for the pigment dispersion A, except that KRONOS2190 (titanium oxide treated with aluminum/zirconium/organic substance, primary particle diameter 200 nm, manufactured by KRONOS INTERNATIONAL Inc.) as the pigment, and SOLSPERSE 32000 (basic dispersant, manufactured by The Lubrizol Corporation) was used as the pigment dispersing resin.

(Pigment Dispersion K)

A pigment dispersion K was obtained in the same manner as in the pigment dispersion operation for the pigment dispersion A, except that KRONOS2310 (titanium oxide treated with aluminum/silica/zirconium/organic substance, primary particle diameter 200 nm, manufactured by KRONOS INTERNATIONAL Inc.) as the pigment, and SOLSPERSE 32000 (basic dispersant, manufactured by The Lubrizol Corporation) was used as the pigment dispersing resin.

The compositions of the pigment dispersions A to K prepared as described above are summarized in Table 1. "DPGDA" listed in Table 1 represents dipropylene glycol diacrylate; "VEEA" represents vinvloxydiethylene glycol acrylate (=vinyloxyethoxyethyl acrylate). The solid content (pigment content) in each of the pigment dispersions A to K is 50% by weight with reference to the total weight of the pigment dispersion.

TABLE 1

| Pigment dispersion | Product name | Primary particle diameter (nm) | Surface treatment | Pigment dispersant | Monomer |
|---|---|---|---|---|---|
| A | TIPAQUE CR-60 | 210 | Aluminum | DISPERBYK-111 | DPGDA |
| B1 | TIPAQUE CR-60 | 210 | Aluminum | SOLSPERSE 32000 | DPGDA |
| B2 | TIPAQUE CR-60 | 210 | Aluminum | SOLSPERSE 32000 | VEEA |
| C1 | TIPAQUE PF-726 | 210 | Aluminum/silica | SOLSPERSE 32000 | DPGDA |
| C2 | TIPAQUE PF-726 | 210 | Aluminum/silica | SOLSPERSE 32000 | VEEA |
| D | TIPAQUE A-220 | 160 | Aluminum | SOLSPERSE 32000 | DPGDA |
| E | TIPAQUE CR-58 | 280 | Aluminum/silica | SOLSPERSE 32000 | DPGDA |
| F | TIPAQUE CR-80 | 250 | Aluminum/silica | SOLSPERSE 32000 | DPGDA |
| G | TIPAQUE CR-60-2 | 210 | Aluminum/polyalcohol | SOLSPERSE 32000 | DPGDA |

TABLE 1-continued

| Pigment dispersion | Product name | Primary particle diameter (nm) | Surface treatment | Pigment dispersant | Monomer |
|---|---|---|---|---|---|
| H | TIPAQUE PF-690 | 210 | Aluminum/silica/polyalcohol | SOLSPERSE 32000 | DPGDA |
| I | KRONOS2064 | 200 | Aluminum/organic substance | SOLSPERSE 32000 | DPGDA |
| J | KRONOS2190 | 200 | Aluminum/zirconium/organic substance | SOLSPERSE 32000 | DPGDA |
| K | KRONOS2310 | 200 | Aluminum/silica/zirconium/organic substance | SOLSPERSE 32000 | DPGDA |

2. Preparation of Ink

Examples 1 to 32, Comparative Examples 1 to 5

According to the recipe of the constituents listed Tables 2 to 4, other components listed in the table were added to each of the pigment dispersions sequentially from the top under stirring, and mixed until the polymerization initiator dissolved. Thereafter, the mixture obtained was filtered through a 1-μm membrane filter, and coarse particles were removed to obtain white inks.

The white inks thus obtained were evaluated for various properties according to the following procedure. The results are shown in Tables 2 to 4.

(Particle Diameter Measurement)

The white inks thus obtained were measured for the pigment particle diameter using a dynamic light scattering particle diameter distribution analyzer Nanotrac UPA (manufactured by Nikkiso Co., Ltd., model number: UPA-EX150). For the measurement, ethyl acetate was used as the measurement solvent, and the absorption mode was particle permeability. Measurement was carried out on the precondition that the particle shape is nonspherical, and the value when the weight cumulative distribution is 50% was used as the weight average particle diameter.

(Evaluation of Decap Property)

Using OnePass JET (manufactured by Tritek Co., Ltd.) as the printing apparatus and KJ4A (manufactured by Kyocera Corporation) as the ink-jet head, the evaluation was carried out according to the following procedure. Firstly, the ink was charged into the ink-jet head, a nozzle check pattern was printed, and the ejection of ink from all the nozzles was confirmed. Thereafter, the apparatus was allowed to stand for predetermined time (2 hours) without nozzle protection such as capping. After the lapse of the defined time, a nozzle check pattern was printed, and the number of nozzle void was confirmed. The evaluation criteria are as follows.

A: No occurrence of nozzle void.
B: Nozzle void is less than five.
C: Nozzle void is five or more.

(Evaluation of Hiding Property)

Using the above-described apparatus used for the evaluation of decap property, solid printing was carried out on a transparent PET film (base material thickness 100 μm) to form an ink coating film having a film thickness of 6 μm. Subsequently, ultraviolet rays were applied using a UV lamp to cure the ink coating film, and thus a measurement sample of a printed material was prepared. The measurement sample was measured for the L* values of the L*a*b* colorimetric system on a black plate (L* value 14) and a white plate (L* value 95). From the L* value thus obtained, the "hiding rate" defined by formula described below was calculated, and the hiding property was evaluated.

Hiding rate (%)=(L* value measured on black plate)/(L* value measured on white plate)×100

The evaluation criteria are as follows.

A: Hiding rate is 75% or more.
B: Hiding rate is 70% or more and less than 75%.
C: Hiding rate is less than 70%.

(Evaluation of Storage Stability)

The measurement of the ink viscosity was carried out using an E type viscometer (manufactured by Toki Sangyo Co., Ltd.). The measurement conditions are as follows: the viscosity was measured at 25° C. three minutes after adjusting the rotation speed to the value appropriated to the measurement. Storage stability was evaluated from the rate of viscosity change between the ink viscosity stored at 60° C. for one week and the ink viscosity before storage. The evaluation criteria are as follows. The rating "C" or higher was judged as practical level.

A: The rate of viscosity change is less than 5%.
B: The rate of viscosity change is 5% or more and less than 10%.
C: The rate of viscosity change is 10% or more and less than 15%.
D: The rate of viscosity change is 15% or more.

(Evaluation of Ejection Property)

Printing was carried out using the head (KJ4A) manufactured by Kyocera Corporation, the condition of ink ejection was observed by stroboscopic photographing, thereby evaluating the frequency properties. The waveform was the Fire 1 mode. For the evaluation, the manner of splitting of droplets was observed at the starting of ejection when the frequency was changed to 5 and 20 kHz, and after continuous ejection for 10 minutes. The manner of splitting of droplets at the points of 1 mm and 2 mm after ejection was observed. The ink is preferably stable without splitting of droplets. The evaluation criteria are as follows. The rating "B" or higher was judged as practical level.

A: Droplets are continuous until 2 mm without splitting, and stable.
B: Droplets are split at 1 mm, and coalesce at 2 mm, or the manner of splitting markedly changes from the early stage.
C: Droplets are split at 1 mm, and do not coalesce even at 2 mm; ejection failure occurs in the early stage or 10 minutes after.

(Hue Evaluation)

Hue evaluation was carried out using the measurement samples prepared in the evaluation of hiding property. These measurement samples were measured on a black plate. From the L*a*b* values thus obtained, the hue was evaluated according to the following evaluation criteria.

A: The b* value is less than −5.
B: The b* value is −5 or more and less than −3.
C: The b* value is −3 or more.

TABLE 2

| | | Example | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Dispersion | Dispersion type | A | B1 | B1 | B1 | C1 | C1 | C1 | C1 | C1 | C1 | C1 | C1 | C1 | B1 | B1 | B2 | B2 |
| | Content | 36 | 36 | 44 | 52 | 36 | 44 | 52 | 44 | 44 | 44 | 44 | 44 | 44 | 44 | 44 | 44 | 44 |
| Monomer | DPGDA | 47 | 47 | 39 | 31 | 47 | 39 | 31 | 9 | 9 | 9 | 9 | 9 | 9 | 24 | 9 | 14.9 | 4.9 |
| | VCAP | 5 | 5 | 5 | 5 | 5 | 5 | 5 | 5 | 5 | 5 | 5 | 5 | 5 | 5 | 5 | 5 | 5 |
| | PEA | | | | | | | | 30 | | | | | | | | | |
| | LA | | | | | | | | | 30 | | | | | | | | |
| | VEEA | | | | | | | | | | 30 | 30 | 30 | 30 | 15 | 30 | 24.1 | 34.1 |
| Initiator | TPO | 9 | 9 | 9 | 9 | 9 | 9 | 9 | 9 | 9 | 9 | | 9 | | 9 | 9 | 9 | 9 |
| | Irg819 | | | | | | | | | | | 9 | | 9 | | | | |
| | BMS | | | | | | | | | | | | 2 | 2 | | | | |
| | Irg907 | 2 | 2 | 2 | 2 | 2 | 2 | 2 | 2 | 2 | 2 | 2 | | | 2 | 2 | 2 | 2 |
| Solvent | DEDG | | | | | | | | | | | | | | | | | |
| Surface conditioner | UV3510 | 1 | 1 | 1 | 1 | 1 | 1 | 1 | 1 | 1 | 1 | 1 | 1 | 1 | 1 | 1 | 1 | 1 |
| Evaluation | Particle diameter (nm) | 210 | 220 | 235 | 240 | 210 | 220 | 230 | 215 | 225 | 220 | 220 | 220 | 220 | 235 | 235 | 240 | 245 |
| | Decap property | B | A | B | B | A | A | A | A | A | A | A | A | A | B | A | A | B |
| | Hiding property | B | B | A | A | B | A | A | A | A | A | A | A | A | A | A | A | A |
| | Stability | C | B | B | C | A | A | A | A | A | A | A | A | A | B | B | C | C |
| | Ejection property | B | B | B | B | B | B | B | B | B | A | A | A | A | B | A | A | A |
| | Hue | B | B | B | B | B | B | B | B | B | B | B | A | A | B | B | B | B |

TABLE 3

| | | Example | | | | | | | | | | | | | | |
|---|---|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 | 32 |
| Dispersion | Dispersion type | C1 | C2 | C2 | G | G | H | H | C1 | C1 | I | I | J | J | K | K |
| | Content | 44 | 44 | 44 | 36 | 44 | 36 | 44 | 44 | 44 | 36 | 44 | 36 | 44 | 36 | 44 |
| Monomer | DPGDA | 24 | 14.9 | 4.9 | 47 | 39 | 47 | 39 | 38 | 33 | 47 | 39 | 47 | 39 | 47 | 39 |
| | VCAP | 5 | 5 | 5 | 5 | 5 | 5 | 5 | 5 | 5 | 5 | 5 | 5 | 5 | 5 | 5 |
| | PEA | | | | | | | | | | | | | | | |
| | LA | | | | | | | | | | | | | | | |
| | VEEA | 15 | 24.1 | 34.1 | | | | | | | | | | | | |
| Initiator | TPO | 9 | 9 | 9 | 9 | 9 | 9 | 9 | 9 | 9 | 9 | 9 | 9 | 9 | 9 | 9 |
| | Irg819 | | | | | | | | | | | | | | | |
| | BMS | | | | | | | | | | | | | | | |
| | Irg907 | 2 | 2 | 2 | 2 | 2 | 2 | 2 | 2 | 2 | 2 | 2 | 2 | 2 | 2 | 2 |
| Solvent | DEDG | | | | | | | | 1 | 6 | | | | | | |
| Surface conditioner | UV3510 | 1 | 1 | 1 | 1 | 1 | 1 | 1 | 1 | 1 | 1 | 1 | 1 | 1 | 1 | 1 |
| Evaluation | Particle diameter (nm) | 220 | 230 | 230 | 215 | 235 | 215 | 230 | 230 | 240 | 210 | 230 | 200 | 225 | 205 | 215 |
| | Decap property | A | A | A | A | B | A | A | B | A | B | A | B | A | A | A |
| | Hiding property | A | A | A | B | A | B | A | A | B | A | B | A | B | A | |
| | Stability | A | A | B | A | A | A | A | A | A | A | A | A | A | A | |
| | Ejection property | A | A | A | B | B | A | B | A | B | B | A | B | A | B | |
| | Hue | B | B | B | B | B | B | B | B | B | B | B | B | B | B | B |

TABLE 4

| | | Comparative Example | | | | |
|---|---|---|---|---|---|---|
| | | 1 | 2 | 3 | 4 | 5 |
| Dispersion | Dispersion type | C1 | C1 | D | E | F |
| | Content | 24 | 66 | 44 | 44 | 44 |
| Monomer | DPGDA | 59 | 17 | 39 | 39 | 39 |
| | VCAP | 5 | 5 | 5 | 5 | 5 |
| | PEA | | | | | |
| | LA | | | | | |
| | VEEA | | | | | |
| Initiator | TPO | 9 | 9 | 9 | 9 | 9 |
| | Irg819 | | | | | |
| | BMS | | | | | |
| | Irg907 | 2 | 2 | 2 | 2 | 2 |
| Solvent | DEDG | | | | | |
| Surface conditioner | UV3510 | 1 | 1 | 1 | 1 | 1 |
| Evaluation | Particle diameter (nm) | 240 | 210 | 160 | 310 | 280 |

TABLE 4-continued

| | Comparative Example | | | | |
|---|---|---|---|---|---|
| | 1 | 2 | 3 | 4 | 5 |
| Decap property | A | C | B | C | C |
| Hiding property | C | A | C | A | A |
| Stability | A | D | C | C | B |
| Ejection property | B | B | B | C | B |
| Hue | C | B | C | C | C |

Details about the abbreviations listed in Tables 2 to 4 are as follows.

DPGDA: dipropylene glycol diacrylate
VCAP: N-vinyl caprolactam
PEA: phenoxyethyl acrylate
LA: lauryl acrylate
VEEA: vinyloxydiethylene glycol acrylate
TPO: Lucirin TPO (manufactured by BASF, 2,4,6-trimethylbenzoyl diphenylphosphine oxide)
Irg819: Irgacure819 (manufactured by BASF, bis(2,4,6-trimethylbenzoyl) phenylphosphine oxide)
BMS: Speedcure BMS (manufactured by Lambson, 4-benzoyl-4'-methyldiphenyl sulfide)
Irg907: Irgacure907 (manufactured by BASF, 2-methyl-1-(4-methylthiophenyl)-2-morpholinopropan-1-one)
UV3510: BYE UV3510 (manufactured by BYK-Chemie, silicone surface conditioner)

As seen by Tables 2 and 3, when the content of titanium oxide used as the white pigment and the weight average particle diameter of titanium oxide are within the predetermined range defined in the present invention, good results are obtained in all the desired properties such as printing stability and hiding property. In contrast, as seen by Table 4, it was difficult to satisfy all the desired properties in Comparative Example 1 to 5, which do not satisfy the content of titanium oxide and the weight average particle diameter of titanium oxide defined in the present invention.

The invention claimed is:

1. An ink, for printing on a single-pass ink-jet printing system said ink comprising titanium oxide, a basic dispersant as a pigment dispersant, and a polymerizable compound,
   wherein a content of the titanium oxide is from 19 to 30% by weight with reference to a total weight of the ink, and
   wherein a weight average particle diameter of the titanium oxide is from 180 to 250 nm, and
   wherein the titanium oxide is a titanium oxide whose surface is treated with at least silica.

2. The ink of claim 1, wherein the titanium oxide has hydroxyl groups on treated surface thereof.

3. The ink of claim 1, wherein the polymerizable compound comprises at least one of the polymerizable compounds of formulae (1) and (2):

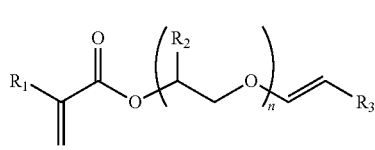

formula (1)

wherein $R_1$ and $R_2$ are each independently a hydrogen atom or a methyl group, $R_3$ is a hydrogen atom or an alkyl group with 1 to 10 carbon atoms, and n is an integer of 1 to 10,

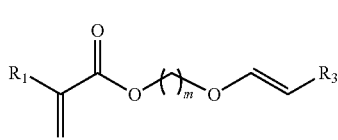

formula (2)

wherein $R_1$ is a hydrogen atom or a methyl group, $R_3$ is a hydrogen atom or an alkyl group with 1 to 10 carbon atoms, and m is an integer of 1 to 10.

4. The ink of claim 1, further comprising a polymerization initiator, wherein the polymerization initiator comprises at least one selected from the group consisting of 2,4,6-trimethylbenzoyl diphenyl phosphine oxide, bis(2,4,6-trimethylbenzoyl)phenylphosphine oxide, and 4-benzoyl-4'-methyldiphenyl sulfide.

5. The ink of claim 1, further comprising an organic solvent, wherein a content of the organic solvent is from 0.01 to 5% by weight with reference to the total weight of the ink.

6. The ink of claim 1, wherein the titanium oxide is present in the ink in an amount of from 19 to 25% by weight with reference to the total weight of the ink.

7. The ink of claim 1, wherein the titanium oxide is titanium oxide whose surface is treated with an aluminum compound and silica.

8. The ink of claim 1, wherein the polymerizable compound comprises at least one selected from the group consisting of lauryl acrylate, dipropylene glycol diacrylate, N-vinyl caprolactam, 1,9-nonanediol diacrylate, and 1,10-decanediol diacrylate.

9. The ink of claim 3, wherein the polymerizable compound comprises at least one selected from the group consisting of lauryl acrylate, dipropylene glycol diacrylate, N-vinyl caprolactam, 1,9-nonanediol diacrylate, and 1,10-decanediol diacrylate.

* * * * *